Sept. 29, 1925.
J. F. SCHIMEK
CLUTCH MECHANISM FOR WEIGHING MACHINES
Filed Sept. 26, 1924
1,555,162
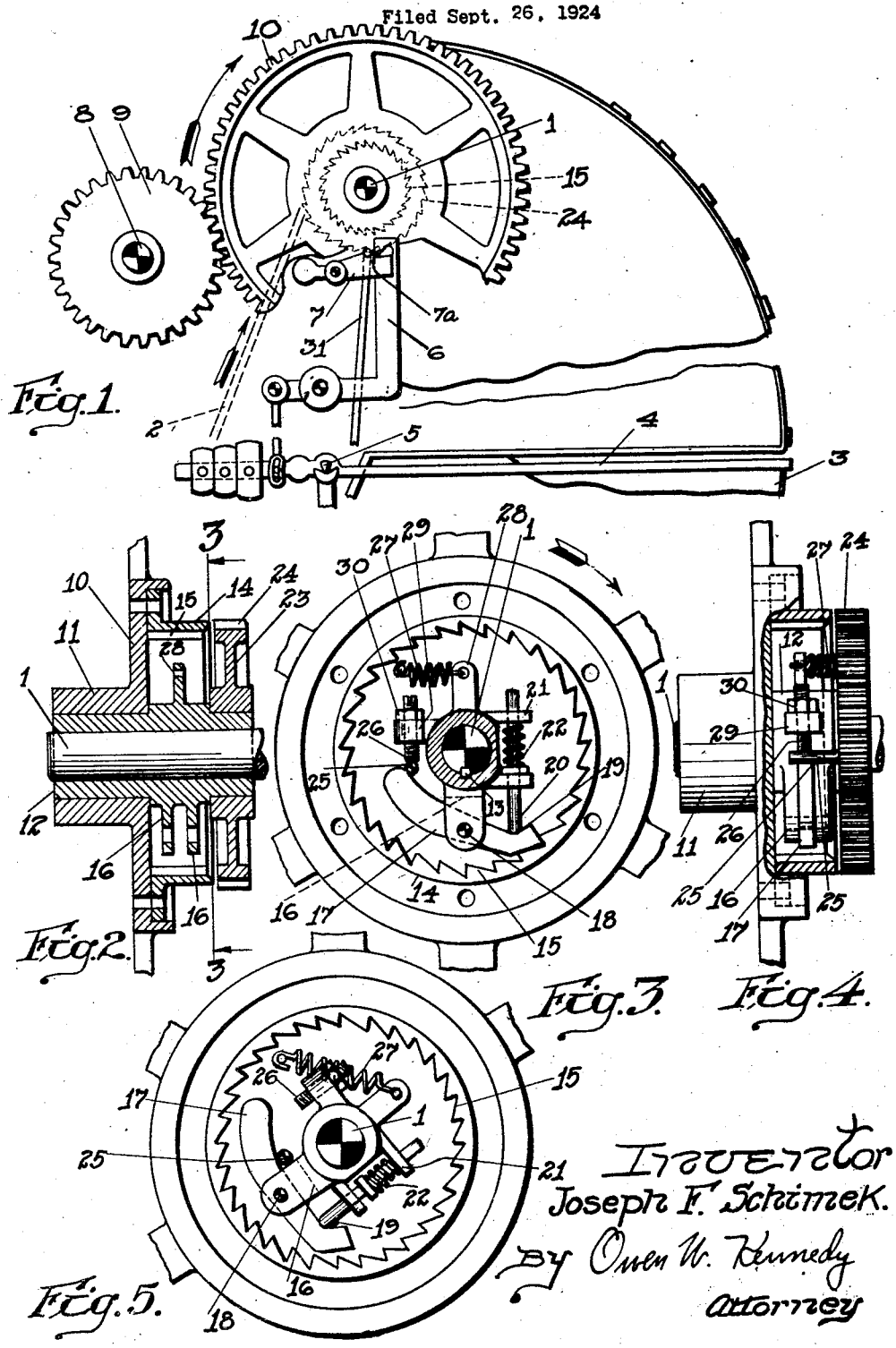
Inventor
Joseph F. Schimek.
By Owen W. Kennedy
Attorney Patented Sept. 29, 1925.

1,555,162

UNITED STATES PATENT OFFICE.

JOSEPH F. SCHIMEK, OF HOLDEN, MASSACHUSETTS, ASSIGNOR TO CASHIKO MACHINE COMPANY, OF WORCESTER, MASSACHUSETTS, A CORPORATION OF MASSACHUSETTS.

CLUTCH MECHANISM FOR WEIGHING MACHINES.

Application filed September 26, 1924. Serial No. 740,023.

*To all whom it may concern:*

Be it known that I, JOSEPH F. SCHIMEK, a citizen of the United States, residing at Holden, in the county of Worcester and Commonwealth of Massachusetts, have invented a new and useful Improvement in a Clutch Mechanism for Weighing Machines, of which the following, together with the accompanying drawings, is a specification.

My invention relates generally to feeding and weighing machines for use in connection with carding apparatus, and has for its object to provide an improved clutch mechanism adapted to control the operation of the feeding apron in timed relation to the weighing mechanism.

For purposes of illustration I have shown the present invention in connection with a feeding and weighing machine of the type illustrated in my Patent No. 1,472,815, issued November 6, 1923, although it is to be understood that the present invention may be employed for analogous purposes in connection with other similar machines. In a machine of the above described type, the weighing mechanism is adapted to control the connection of the shaft driving the feeding apron to its source of power, and it is most essential that the connection, or disconnection, of the feeding apron shaft to the source of power, be accomplished almost instantaneously, so that no more material will be fed into the weighing hopper after the latter has been moved downwardly by the accumulation of a charge therein.

According to the present invention, I provide a clutch mechanism that is particularly adapted to disconnect a shaft from a source of power, such as a continuously driven rotating member, as soon as the movement of a portion of the clutch mechanism has been arrested. My improved clutch mechanism is entirely automatic in its operation, and is adapted to connect, or disconnect, the shaft almost instantaneously, as will hereinafter more fully appear, with reference to the accompanying drawings in which Fig. 1 is a view in end elevation, showing a portion of the parts of a feeding and weighing machine provided with my improved clutch mechanism.

Fig. 2 is an enlarged vertical sectional view of a portion of the parts shown in Fig. 1.

Fig. 3 is a vertical sectional view along the line 3—3, Fig. 2, looking in the direction of the arrows.

Fig. 4 is a view, partly in section and partly in side elevation, of the parts shown in Fig. 2.

Fig. 5 is a view similar to Fig. 3, showing the position of the parts when the apron shaft is disconnected.

Like reference characters refer to like parts in the different figures.

Referring to Fig. 1, a portion of a feeding and weighing machine is shown to illustrate the application of my invention thereto. The machine comprises a shaft 1 which, by its rotation, is adapted to drive an apron 2 in the direction of the arrow, so as to convey the material to be carded to the upper part of the machine from where it falls into the weighing hopper 3. The weighing hopper 3 is carried by arms 4 pivoted at 5, and the accumulation of material in the hopper 3 is adapted to cause it to move downwardly when a predetermined amount of material has accumulated therein.

The downward motion of the hopper 3 is adapted to be transmitted to a bell-crank lever 6 connected to the arm 4, and movement of the lever 6 is adapted to release a gravity actuated pawl 7. The shaft 1 is adapted to be driven from a suitable source of power, such as a shaft 8, through gears 9 and 10, and it is the object of the present invention to provide an improved clutch mechanism, controlled by the position of the hopper 3, for connecting, or disconnecting, the apron shaft 1 and the power shaft 8.

Referring now to Figs. 2 to 5 inclusive, the gear 10 is shown as being provided with a hub 11 which is loosely mounted on a sleeve 12 connected to the shaft 1 by a key 13. The gear 10 is further provided with an annular flange 14 concentric with the sleeve 12, the inner surface of which is provided with a number of teeth 15. The sleeve 12 provides a pair of ears 16, between which is pivotally mounted a pawl 17 on a pin 18. One end of the pawl 17 is provided with a seat 19 for receiving the end of a thrust pin 20 slidably mounted between projections 21 carried by the sleeve 12. A coil spring 22 surrounds the pin 20 and tends to hold its end in the seat 19 of the pawl 17. The pressure of the spring 22 tends to turn the pawl 17 in a clockwise direction, and thereby cause it to engage one of the teeth 15 of the flange 14. When the pawl 17 is so engaged with a tooth 15, it is obvious that a driving connection will be established between the gear 10 and the shaft 1, the direction of rotation being indicated by the arrow in Fig. 3.

A ratchet wheel 23 is loosely mounted on the sleeve 12 beyond the pawl 17 and is provided with circumferentially arranged teeth 24 which are concentric with the teeth 15 of the flange 14. As best shown in Fig. 4, the ratchet wheel 23 carries a pin 25 which projects into the space between the sleeve 12 and the flange 14 to a point closely adjacent the end of the pawl 17. The pin 25 is normally maintained in engagement with the end of a stud 26 carried by the sleeve 12, by means of a spring 27 connected at its ends to the ratchet wheel 23 and to an arm 28 extending from the sleeve 12. The stud 26 is in threaded engagement with a lug 29, also carried by the sleeve 12, and a lock nut 30 is provided for maintaining the stud 26 in any desired position. With the parts in the position shown in Fig. 3, it is obvious that the ratchet wheel 23 will rotate with the sleeve 12 so long as the ratchet wheel 23 is not subjected to any force tending to arrest its rotation.

Referring again to Fig. 1, it will be seen that the arm 4 carrying the hopper 3, will be turned in a clockwise direction about its pivot whenever enough material accumulates in the hopper 3 to counterbalance the weights carried by the arm 4. When this occurs the bell-crank lever 6 is rocked on its pivot, thereby releasing the pawl 7, which is immediately turned to bring its tooth 7ª into engagement with one of the teeth 24 of the ratchet wheel 23. In this way rotation of the ratchet wheel 23 is immediately arrested.

When the ratchet wheel 23 is so held, the sleeve 12 continues to turn with the gear 10 by reason of the fact that the pawl 17 is still in engagement with one of the teeth 15. As the sleeve 12 moves from the position shown in Fig. 3 into the position shown in Fig 5, it is evident that relative movement will occur between the free end of the pawl 17 and the then stationary pin 25 projecting from the ratchet wheel 23. As this occurs, the pin 25 exerts a camming action on the pawl 17 which moves the pawl about its pivot pin 18 to withdraw its other end from the particular tooth 15 with which it is engaged. This action is clearly indicated in Fig. 5, in which the spring 22 is shown as having been compressed by the retraction of the pin 20, while the spring 27 is shown as having been extended to permit relative movement between the sleeve 12 and the stationary ratchet wheel 23. As soon as the pawl 17 is withdrawn from a tooth 15, it is evident that the connection between the rotating gear 10 and the shaft 1 is broken, so that the apron 2 is no longer driven by the shaft 1.

From an inspection of Figs. 3 and 5, it will be apparent that the withdrawal of the pawl 17 from a tooth 15 occurs immediately following the checking of the movement of the ratchet wheel 23, the turning of the sleeve 12 through only a very small portion of a complete revolution, being sufficient to bring about the disengagement of the pawl 17 through the camming action of the pin 25 on the pawl 17. For this reason my improved clutch is effective to stop further movement of the apron 2 as soon as the weighing hopper 3 moves downwardly.

As soon as the hopper 3 moves downwardly, it is opened by suitable means, not shown, to discharge the material therein, whereupon it returns to its normal position. At the same time the pawl 7 is disengaged from the ratchet wheel 23 by means of an operating rod 31, thereby returning the pawl to the position shown in Fig. 1, in which position it is maintained out of engagement with the ratchet wheel 23. The particular mechanism for opening the weighing hopper 3, and for withdrawing the pawl 7 from the ratchet wheel 23, forms no part of the present invention and is fully shown and described in my above mentioned Patent No. 1,472,815.

As soon as the pawl 7 is disengaged from the ratchet wheel 23, the latter is free to turn, whereupon the spring 27 tends to return it to its original position on the sleeve 12, with the pin 25 in engagement with the end of the stud 26. As the pin 25 is thus moved, the spring 22 is again free to push the other end of the pawl 17 outwardly into the path of a tooth 15, thereby reestablishing the driving connection between the gear 10 and the shaft 1. Movement of the feeding apron 2 is then resumed until enough material has been delivered to the weighing hopper 3 to again cause its actuation, whereupon the movement of the ratchet wheel 23 is again arrested. It is evident that the above described mechanism will continue to function so as to automatically connect the apron shaft 1 to the source of power in accordance with the operation of the weighing hopper 3.

From the foregoing it is apparent that by my invention I have provided an improved clutch mechanism that is particularly adapted to control the operation of the feeding apron of a weighing machine in accordance with the actuation of the weighing mechanism. While I have shown my invention in connection with a feeding and weighing machine of a particular type, it is obvious that it is not so limited, but may as well be employed in connection with other machines of the same general type. I desire therefore, that only such limitations be imposed thereon as come within the scope of the appended claims.

I claim:

1. In a machine of the class described, a rotatable shaft for driving a conveyor apron, a driving element coaxial with said shaft, a pivotally mounted pawl rotatable with said shaft for connecting said driving element thereto, a ratchet wheel coaxial with said apron shaft having a projection in engagement with said pawl, the said projection being adapted to turn said pawl about its pivotal axis when said ratchet wheel is held against rotation, and means for adjusting the initial position of engagement of said projection with said pawl.

2. In a machine of the class described, a rotatable shaft for driving a conveyor apron, a driving element coaxial with said shaft, a pivotally mounted pawl rotatable with said shaft for connecting said driving element thereto, a ratchet wheel coaxial with said apron shaft having a projection in engagement with said pawl, means for holding said ratchet wheel against rotation, whereby said pawl is turned about its pivotal axis by said projection to disconnect said apron shaft from said driving element, and means for adjusting the initial position of engagement of said projection with said pawl, whereby to cause the disengaging operation to occur in a minimum of time.

3. In a machine of the class described, a rotatable shaft for driving a conveyor apron, a pivotally mounted spring pressed pawl rotatable with said shaft, a driving element coaxial with said shaft and having a series of internal teeth surrounding said pawl, a ratchet wheel coaxial with said apron shaft having a projection in engagement with said pawl, and means for arresting rotation of said ratchet wheel, whereby its projection by relative movement towards the pivotal axis of said pawl causes said pawl to be turned about its pivotal axis to withdraw it from the tooth with which it is in engagement.

4. In a clutch mechanism, a shaft, a member coaxial with said shaft, an internal ratchet gear connected to said member, a spring pressed pawl pivotally carried by said shaft engaging with said internal ratchet gear and thus normally connecting said shaft with said coaxial member, a second member coaxial with said shaft normally movable with said shaft, a pin carried by said second member in engagement with a surface of said pawl, and means to hold said second member, whereby said pin is also held, and further movement of said pawl, by a relative motion of said pin towards the pivot of said pawl, disengages the latter from the said ratchet gear, thus disconnecting the shaft from the first coaxial member, the pressure of the pin on the pawl being greatest at the start of said action, due to subsequent shortening of the effective leverage.

5. In a clutch mechanism, a shaft, a member coaxial with said shaft, an internal ratchet gear connected to said member, a spring pressed pawl pivotally carried by said shaft engaging with said internal ratchet gear and thus normally connecting said shaft with said coaxial member, a second member coaxial with said shaft normally movable with said shaft, a pin carried by said second member in engagement with a surface of said pawl, means to hold said second member, whereby said pin is also held, and further movement of said pawl, by a relative motion of said pin towards the pivot of said pawl, disengages the latter from the said ratchet gear, thus disconnecting the shaft from the first coaxial member, the pressure of the pin on the pawl being greatest at the start of said action, due to subsequent shortening of the effective leverage, and adjustment means controlling the initial engagement of said pin with said pawl before said relative movement, whereby said disengaging action may be adjusted to act practically instantaneously.

JOSEPH F. SCHIMEK.